US008146753B2

(12) United States Patent
Yuyama

(10) Patent No.: US 8,146,753 B2
(45) Date of Patent: Apr. 3, 2012

(54) MEDICINE CART

(75) Inventor: Shoji Yuyama, Toyonaka (JP)

(73) Assignee: Yuyama Mfg. Co., Ltd., Osaka (JP)

(*) Notice: Subject to any disclaimer, the term of this patent is extended or adjusted under 35 U.S.C. 154(b) by 311 days.

(21) Appl. No.: 12/293,800

(22) PCT Filed: Mar. 15, 2007

(86) PCT No.: PCT/JP2007/055211
§ 371 (c)(1),
(2), (4) Date: Sep. 19, 2008

(87) PCT Pub. No.: WO2007/111142
PCT Pub. Date: Oct. 4, 2007

(65) Prior Publication Data

US 2010/0164337 A1 Jul. 1, 2010

(30) Foreign Application Priority Data

Mar. 27, 2006 (JP) ................................ 2006-085533

(51) Int. Cl.
*A47F 1/04* (2006.01)
*B65G 11/00* (2006.01)
*B65H 1/08* (2006.01)

(52) U.S. Cl. ........... 211/59.3; 211/74; 312/71; 312/209; 221/227

(58) Field of Classification Search ................ 211/4, 45, 211/59.2, 59.3, 74, 90.02, 126.15, 162, 175, 211/189; 221/93, 123, 125, 227, 279, 281, 221/57; 312/35, 42, 61, 71, 209, 221–222, 312/249.11, 333; 206/556
See application file for complete search history.

(56) References Cited

U.S. PATENT DOCUMENTS 4,134,520 A * 1/1979 Collins et al. ................ 221/129
(Continued)

FOREIGN PATENT DOCUMENTS

EP 1541114 A1 * 6/2005
(Continued)

OTHER PUBLICATIONS

Search Report for PCT/JP2007/055211 (3 pages in English and Japanese).

(Continued)

*Primary Examiner* — Darnell Jayne
*Assistant Examiner* — Joshua Rodden
(74) *Attorney, Agent, or Firm* — Jones Day; Christopher C. Bolten

(57) ABSTRACT

A medicine cart (1) is provided which includes a plurality of cassettes (10) which are upwardly open and each accommodate a plurality of medicine containers in an upright state in a row. The plurality of cassettes (10) are placed on a shelf plate (8) which can be drawn out of a main body (3) of the medicine cart (1). A pressing member (47) is provided in each cassette (10) and forwardly presses a rearmost medicine container in its respective cassette (10). Each cassette (10) has a locking means (61) for locking the pressing member (47) at a predetermined position in the cassette (10), and an unlocking means (62, 63) for canceling the lock of the pressing member (47) by the locking means (61) if the shelf plate (8) is pushed in or drawn out of the main body (3) of the medicine cart (1).

17 Claims, 20 Drawing Sheets

U.S. PATENT DOCUMENTS

| | | | | |
|---|---|---|---|---|
| 4,200,201 | A * | 4/1980 | Collins et al. | 221/129 |
| 4,397,606 | A * | 8/1983 | Bruton | 414/800 |
| 4,730,741 | A * | 3/1988 | Jackle et al. | 211/59.3 |
| 4,762,236 | A * | 8/1988 | Jackle et al. | 211/59.3 |
| 4,771,898 | A * | 9/1988 | Howard et al. | 211/59.2 |
| 4,836,390 | A * | 6/1989 | Polvere | 211/59.3 |
| 4,907,707 | A * | 3/1990 | Crum | 211/59.3 |
| 5,012,936 | A * | 5/1991 | Crum | 211/59.3 |
| 5,123,546 | A * | 6/1992 | Crum | 211/59.3 |
| 5,263,596 | A * | 11/1993 | Williams | 221/153 |
| 5,460,294 | A * | 10/1995 | Williams | 221/2 |
| 5,570,811 | A | 11/1996 | Wittern, Jr. et al. | |
| 6,375,015 | B1 * | 4/2002 | Wingate | 211/59.3 |
| 6,659,293 | B1 * | 12/2003 | Smith | 211/59.2 |
| 6,843,382 | B2 * | 1/2005 | Kanouchi et al. | 211/90.02 |
| 6,964,344 | B1 * | 11/2005 | Kim | 211/74 |
| 7,048,142 | B1 * | 5/2006 | Michael et al. | 221/6 |
| 7,469,791 | B2 * | 12/2008 | Phoy | 211/59.2 |
| 7,661,553 | B2 * | 2/2010 | Zeiron | 221/46 |
| 7,686,184 | B2 * | 3/2010 | Yuyama et al. | 221/210 |
| 7,690,519 | B2 * | 4/2010 | Kahl et al. | 211/59.2 |
| 7,822,505 | B2 * | 10/2010 | Yuyama et al. | 700/242 |
| 7,876,993 | B2 * | 1/2011 | Krampotich et al. | 385/135 |
| 2001/0008984 | A1 * | 7/2001 | Omura et al. | 700/241 |
| 2003/0201697 | A1 * | 10/2003 | Richardson | 312/209 |
| 2003/0222548 | A1 * | 12/2003 | Richardson et al. | 312/209 |
| 2006/0113314 | A1 * | 6/2006 | Yuyama et al. | 221/222 |
| 2006/0186065 | A1 * | 8/2006 | Ciesick | 211/59.3 |
| 2007/0194037 | A1 * | 8/2007 | Close | 221/100 |
| 2007/0221680 | A1 * | 9/2007 | Yuyama | 221/124 |
| 2007/0241122 | A1 * | 10/2007 | Yuyama et al. | 221/56 |
| 2007/0262084 | A1 * | 11/2007 | Yuyama et al. | 221/135 |
| 2008/0083769 | A1 * | 4/2008 | Yuyama et al. | 221/1 |

FOREIGN PATENT DOCUMENTS

| | | | |
|---|---|---|---|
| EP | 1813248 | A1 * | 8/2007 |
| EP | 1857382 | A1 * | 11/2007 |
| JP | 9-264290 | A | 10/1997 |
| JP | 2001-198194 | | 7/2001 |
| JP | 2001-258994 | | 9/2001 |
| JP | 2005-280971 | | 10/2005 |
| JP | 2005-330048 | A | 12/2005 |
| JP | 2006110161 | A * | 4/2006 |
| WO | WO 2004012647 | A1 * | 2/2004 |
| WO | WO 2004034955 | A1 * | 4/2004 |
| WO | WO 2005110333 | A1 * | 11/2005 |
| WO | WO 2005110334 | A1 * | 11/2005 |
| WO | WO 2006041072 | A1 * | 4/2006 |

OTHER PUBLICATIONS

European Search Report for EP 07738661.3-1238, 6 pages, mailed Oct. 12, 2011.

* cited by examiner

MEDICINE CART

CROSS-REFERENCE TO RELATED APPLICATIONS

This application is a 35 U.S.C §371 U.S. national stage filing of International Patent Application No. PCT/JP2007/055211, filed Mar. 15, 2007, the entire contents of which are incorporated by reference herein, which claims priority under 35 U.S.C. §119 to Japanese Patent Application No. 2006-085533, filed Mar. 27, 2006, the entire contents of which are incorporated by reference herein.

TECHNICAL FIELD

The present invention relates to a medicine cart having a large number of cassettes each of which stores a plurality of medicine containers arranged in an upright state in a row and which are respectively provided for different types of medicine containers. The cassettes allow the removal or replacement of medicine containers, as may be required at a hospital or the like, one by one starting from the front, and also allow the calculation of the quantity of medicine containers removed and provide stock control thereof.

BACKGROUND

Patent Documents 1 and 2 propose a medicine storage device in which a cassette which is inclined, with the medicine container removal side thereof facing downward, stores a plurality of medicine containers arranged in a row, in which the medicine containers are biased forwards by a weight that is in contact with the rearmost medicine container, and which allows the medicine containers to be taken out or returned one by one through an entrance/exit provided in a corner of the front end of the cassette.

Patent Document 3 proposes a device in which a plurality of ampoules are accommodated in a row in a shelf portion, in which the rearmost ampoule is followed by a linear movement member, and in which the linear motion of the linear movement member is converted to a rotary motion, with the number of accommodated ampoules being counted based on the rotational displacement thereof.

Further, Patent Document 4 also proposes a device in which, as in Patent Documents 1 through 3, ampoules are placed in a row in a medicine placing portion and biased forwardly by a pressing member.

Patent Document 1: JP 2001-198194 A
Patent Document 2: JP 2001-258994 A
Patent Document 3: JP 2005-280971 A
Patent Document 4: JP 2005-330048 A

SUMMARY OF THE INVENTION

In the devices of Patent Documents 1, 2, and 3, it is necessary for the operator to fill the cassette with the ampoules one by one while pressing by hand the biasing member against the biasing force, resulting in a rather poor workability in a filling operation. In the device of Patent Document 4, the surface of the pressing member facing the medicine is formed so as to be curved and away from the ampoules as it extends upwardly, whereby the ampoule inserting operation is smooth; however, the difficulty of filling the cassette with the ampoules one by one while pressing the biasing member against the biasing force is not eliminated.

The present invention has been made in view of the aforementioned problem. It is accordingly an object of the present invention to provide a medicine cart which is easily filled with medicine containers and which is of excellent workability.

In order to solve the aforementioned problem, the present invention provides a medicine cart including: a cassette which is upwardly open and accommodating a plurality of medicine containers in an upright state in a row; a shelf plate on which a plurality of the cassettes are placed and which can be drawn out of a main body of the medicine cart; and a pressing member provided in the cassette and adapted to forwardly press a rearmost medicine container, in which a locking means for locking the pressing member at a predetermined position in the cassette, and an unlocking means for canceling the lock of the pressing member by the locking means if the shelf plate is pushed in or pulled out, are provided.

When the shelf plate is drawn out, the pressing member can be locked at a predetermined position by the locking means. Since the unlocking means cancels the lock of the pressing member conducted by the locking means if the shelf member is pushed in, there is no need to perform any special lock canceling after the completion of the medicine container refilling operation.

It is desirable for the locking means to include a locking lever rotatably provided on the cassette, and for the locking lever to be provided with a claw to be locked to the pressing member, with the claw being biased in a direction to be locked to the pressing member.

It is desirable for the locking lever of each cassette to be fixed to a common spindle and rotatable around the common spindle. This helps to eliminate the need for provision of a spindle for each cassette, and further, since it is only necessary to rotate a single locking lever, it is possible to realize a simple construction.

It is desirable for the unlocking means to include an unlocking lever which is rotatably provided on the shelf plate and adapted to rotate the locking lever against a biasing force to cancel the engagement of the claw of the locking lever and the pressing member, and an unlocking member which is provided on the main body of the medicine cart and adapted to be locked to the unlocking lever of at least one cassette at the time of pushing-in and drawing-out of the shelf plate.

It is desirable for the unlocking lever to include an engagement portion to be engaged with the unlocking member and an operating portion abutting the locking lever to operate the locking lever.

It is desirable for the engagement portion of the unlocking lever to extend downwards from the spindle of the unlocking lever, with the operating portion extending horizontally on both sides from the spindle of the locking lever. With this construction, whether the unlocking pin is engaged with the engagement portion from the pushing-in side or from the drawing-out side, the operating portion rotates, enabling the locking lever to operate.

It is desirable for the unlocking member to include a first unlocking member provided on the front side portion of the main body and a second unlocking member provided on the rear side portion thereof. With this construction, when the shelf plate is pushed in, the unlocking lever immediately abuts the first unlocking member to cancel the lock, and hence the row of medicine containers in alignment are not disturbed or the rearmost medicine does not topple down.

It is desirable for the unlocking member to include a pin. Instead, it may also be a plate-like projecting member, or a substitute such as a screw or the like.

The unlocking member may be an unlocking bar having at both ends thereof a first unlocking end provided at a front side portion of the main body and a second unlocking end provided at a rear side portion of the main body.

According to the present invention, there is provided a locking means and an unlocking means for a pressing member within a cassette. By locking the pressing member at a predetermined position, there is no need to fill the cassette with medicine containers while pressing the pressing member against the biasing force, making it possible to perform medicine charging operation easily and quickly. Further, it is also possible to charge a plurality of medicine containers at the same time. Because the locking means is unlocked pushing in or pulling out the shelf plate, there is no need to perform any special canceling operation after the completion of the medicine charging operation, whereby the difficulty in charging medicine is eliminated, and an improvement in terms of workability is achieved.

BRIEF DESCRIPTION OF THE DRAWINGS

FIG. 1(*b*) is a side sectional view of the medicine cart of FIG. 1(*a*).

FIG. 2(*b*) is a side sectional view of the medicine cart of FIG. 2(*a*).

FIG. 10(*b*) is a back view of the pressing member of FIG. 10(*a*).

FIG. 10(*c*) is a plan view of the pressing member of FIG. 10(*a*).

DESCRIPTION OF REFERENCE SYMBOLS

| | |
|---|---|
| 1 | medicine cart, |
| 8 | shelf plate, |
| 10 | cassette, |
| 15 | medicine containers, |
| 47 | pressing member, |
| 61 | locking lever (locking means), |
| 62 | unlocking lever (locking means), |
| 63 | unlocking pin (locking means), |
| 63A | first unlocking pin (locking means), |
| 63B | second unlocking pin (locking means), |
| 63C | unlocking bar (locking means), |
| 66 | claw, and |
| 68 | torsion spring. |

DETAILED DESCRIPTION

Hereinafter, embodiments of the present invention are described with reference to the accompanying drawings.

Figure 1B:
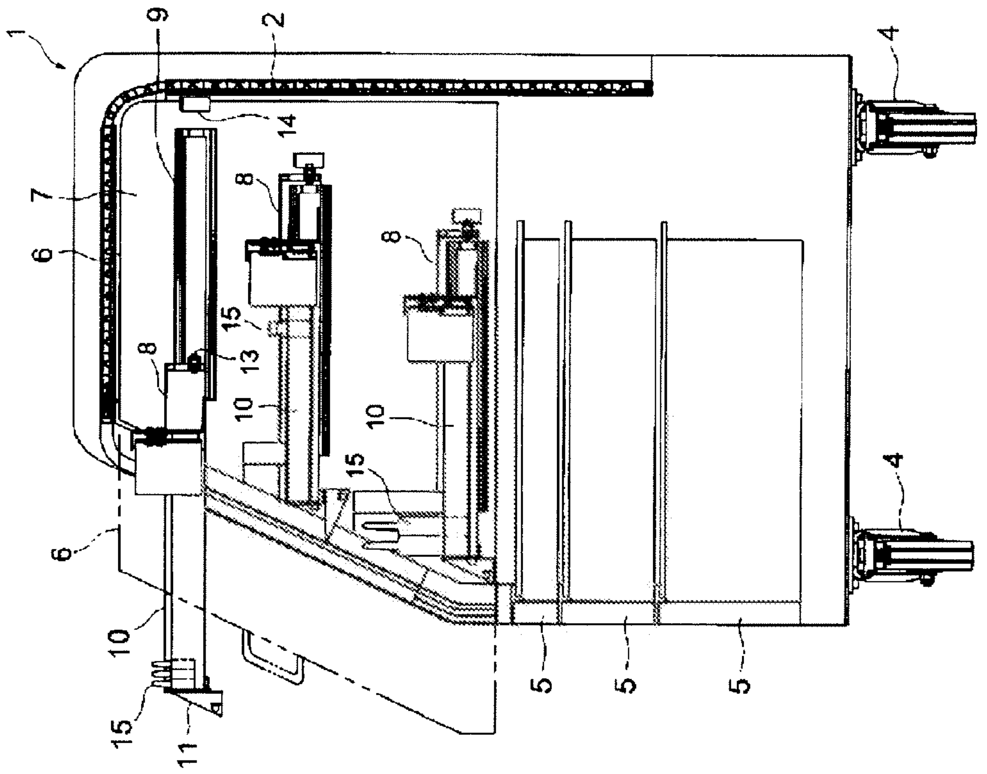
FIG. 1(*a*) is an elevation view of a medicine cart according to the present invention.
Figure 1A:
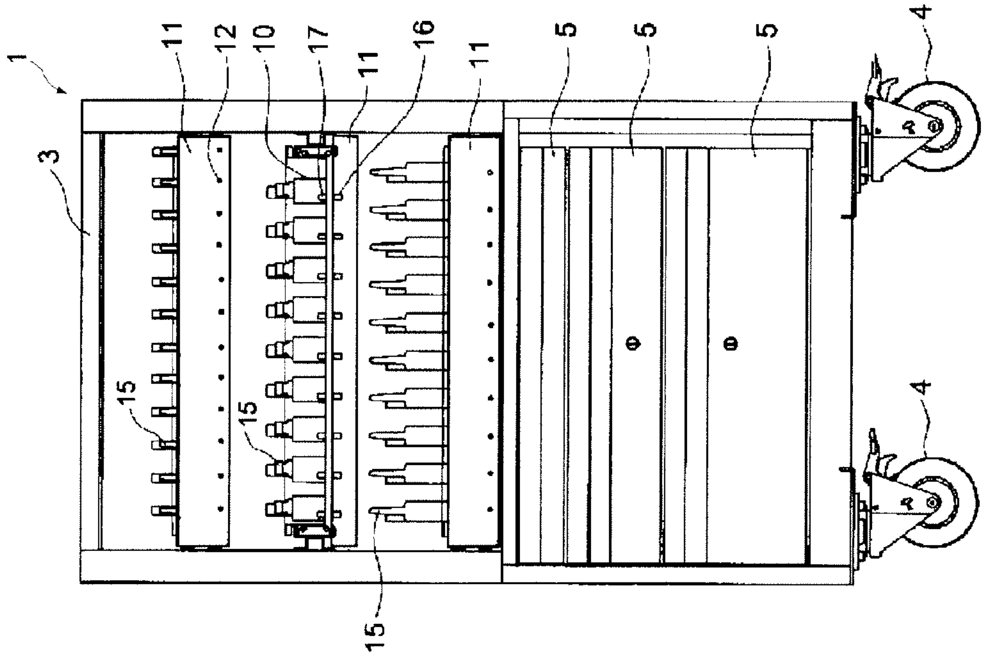
Figure 2B:
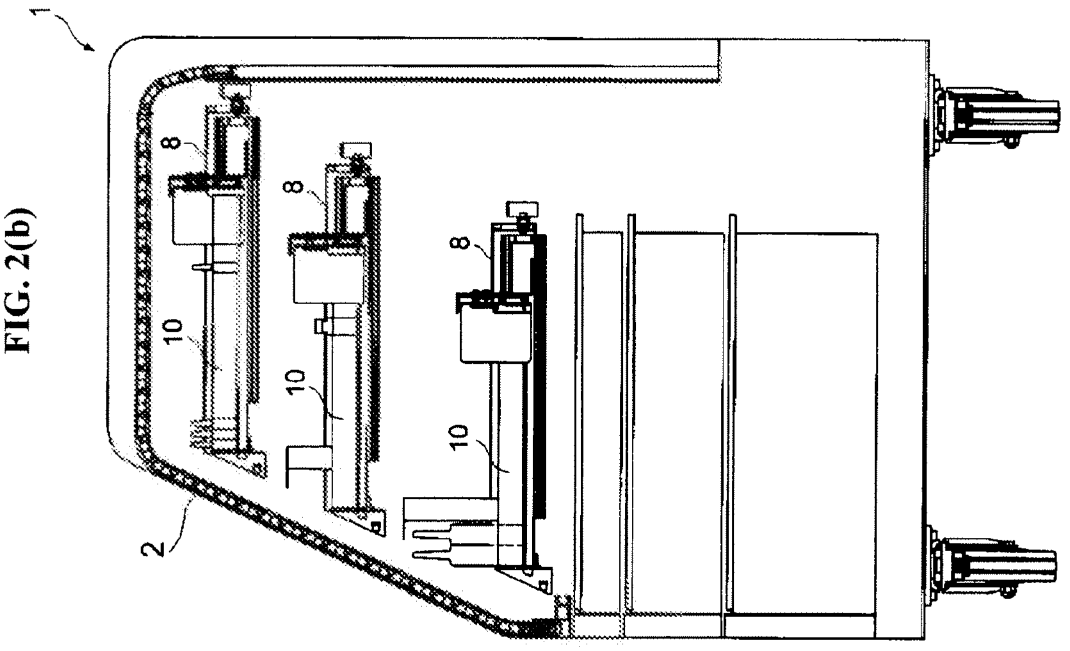
FIG. 2(*a*) is an elevation view of the medicine cart of FIGS. 1(*a*)-1(*b*) with a shutter closed.
Figure 2A:
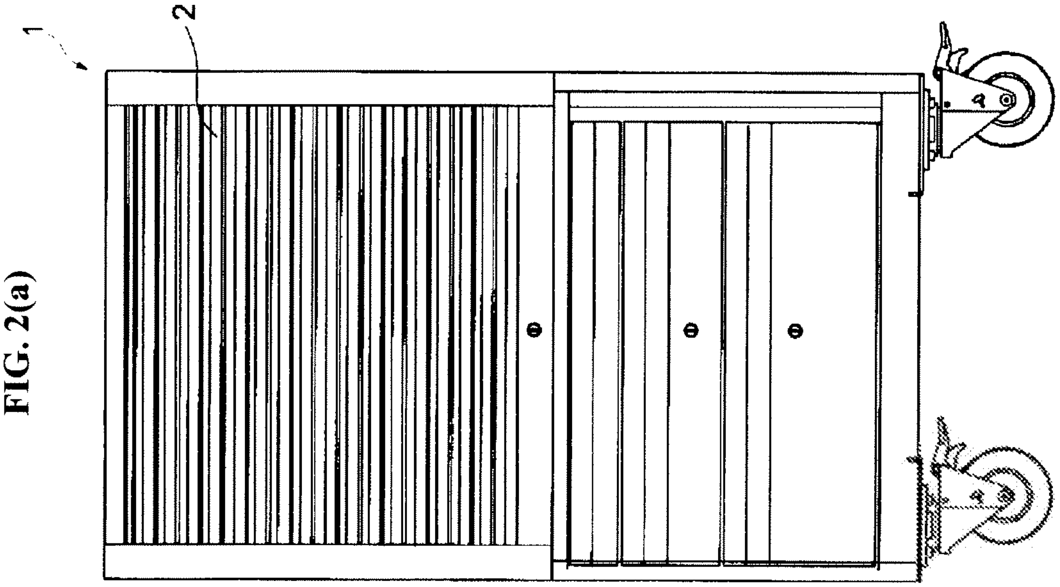

FIGS. 1(*a*)-1(*b*) are, respectively, an elevation view and a side sectional view of a medicine cart 1 according to the present invention, and FIGS. 2(*a*)-2(*b*) are, respectively, an elevation view and a side sectional view of the medicine cart 1 of FIGS. 1(*a*)-1(*b*) with a shutter 2 thereof closed.

The medicine cart 1 has a main body 3 formed in a box-like shape and having an open front surface. The lower half part of the front surface of the main body 3 is oriented perpendicularly, and the upper half part thereof is inclined rearward. On the bottom surface of the main body 3, four casters 4 are provided so that the medicine cart 1 is movable. On the lower half part of the main body 3, three drawer bodies 5 are so provided vertically as to be drawable forward. In these drawer bodies 5, different types of supplies are stored. The opening in the front surface of the upper half part of the main body 3 is closable by the shutter 2 as shown in FIGS. 2(*a*)-2(*b*). Within the upper half part of this main body 3, a drawing rack 6 is so provided as to be drawable forward.

Figure 4:
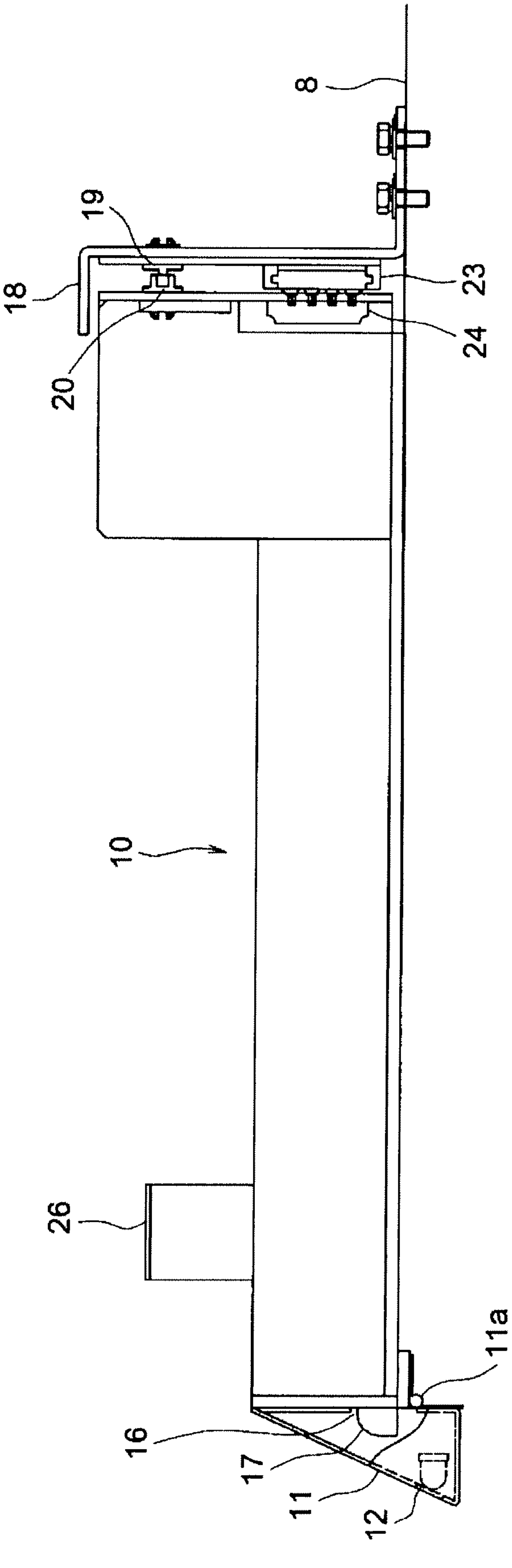
FIG. 4 is a side view of the cassette.
Figure 5:
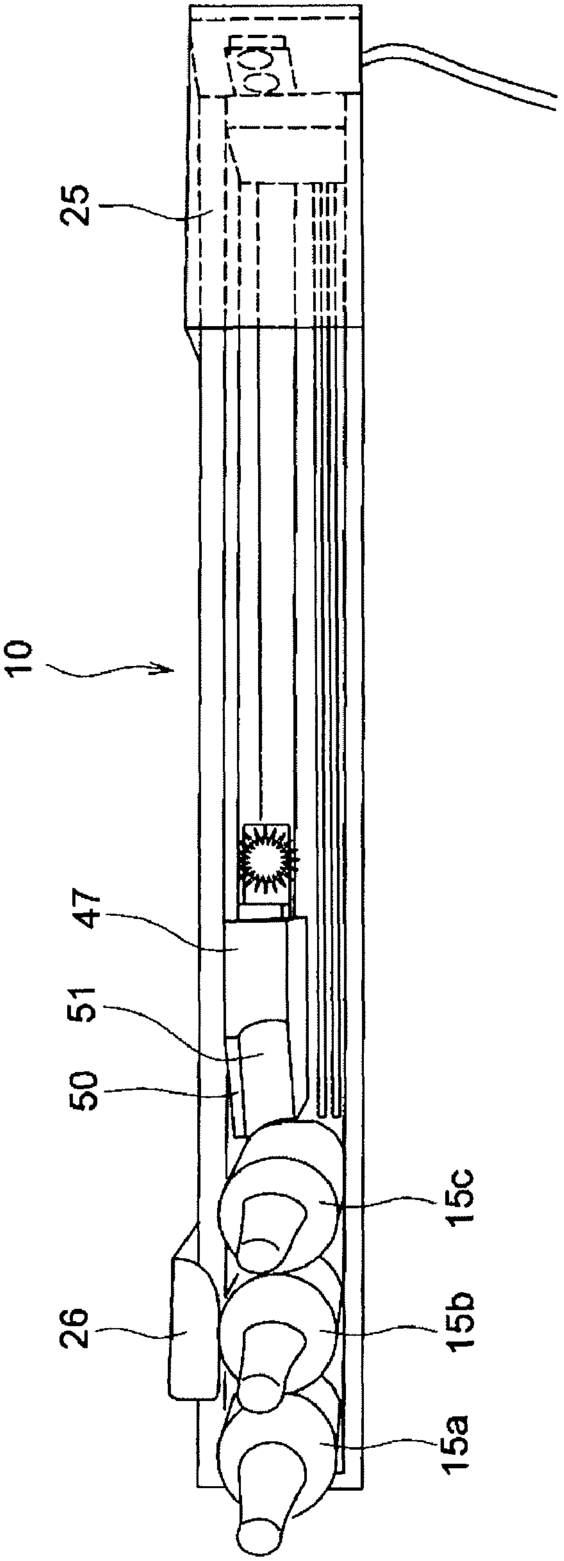
FIG. 5 is a diagram of the cassette as viewed from the above.

The aforementioned drawing rack 6 includes side plates 7 on the right and left sides and shelf plates 8 provided vertically in three steps. Each shelf plate 8 is so supported as to be drawable forward along a slide rail 9 provided on the side plate 7 on the right and left sides. The front ends of the shelf plates 8 provided vertically in three steps are arranged in a step-like manner so that the one in the first step is located more forward while those in the second and third steps are shifted more rearward at more upward position from the second to the third levels. On the top surfaces of the shelf plates 8, a plurality of cassettes 10 are arranged respectively. To the front end of each shelf plate 8, as shown in FIG. 4, a front panel 11 is so fitted as to be rotatable about a spindle 11*a* between the upright position (see the cassettes 10 in the first and third steps of FIG. 1(*b*)) and the horizontal position (see the cassette 10 in the second step of FIG. 1(*b*)). Referring again to FIGS. 1(*a*)-1(*b*), within the front panel 11, an LED 12 is provided at a position facing the cassette 10. To the rear end of each shelf plate 8, a catch 13 is provided, which engages with a catch receiver 14 provided to the side plate 7 when the shelf plate 8 is pressed in, to thereby prevent the shelf plate 8 from improperly dropping out due to shock or the like.

The respective cassettes 10 of the shelf plates 8 store different types of medicine containers (ampoules in this embodiment) 15 and thus have different sizes depending on the medicine containers 15 to be stored, though their basic structure are the same. Hereinafter, a description is given, referring to any one of the cassettes 10.

Figure 3:
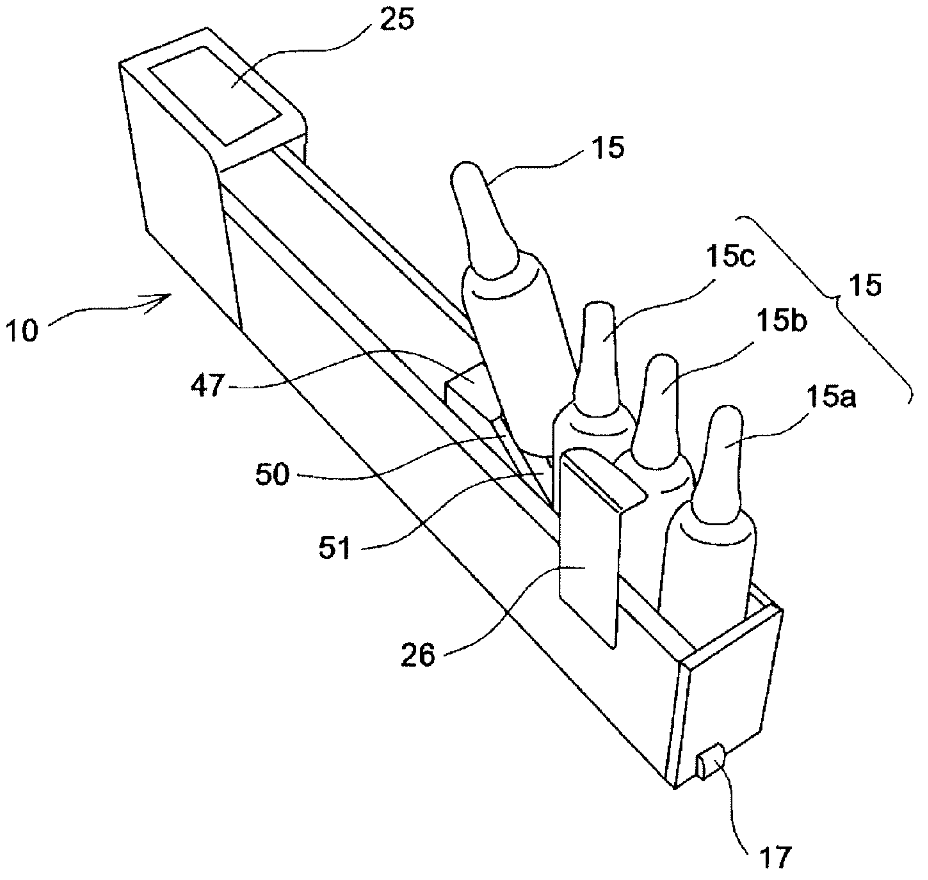
FIG. 3 is a perspective view of a cassette.
Figure 6A:
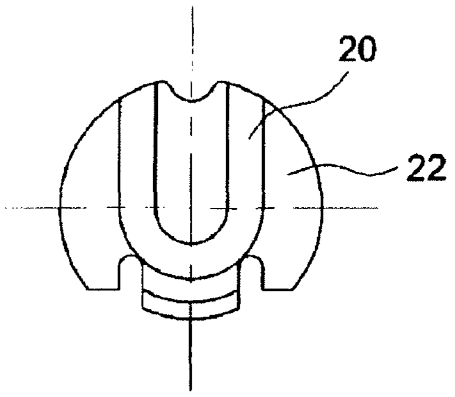
FIGS. 6(*a*)-6(*b*) are elevation views of a pin and a pin receiver of the cassette, respectively.
Figure 6B:
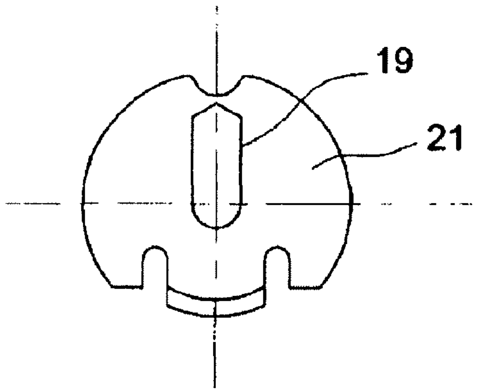

As shown in FIG. 3, the cassette 10 has an anteroposteriorly long box shape with the upper side thereof opening and is capable of storing the medicine containers 15 arranged in a row. The rear portion of the cassette 10 is formed higher than the front portion of the cassette 10. On the front end surface of the cassette 10, as shown in FIG. 4, there is formed a projection 17 which engages with a hole 16 provided in the rear surface of the front panel 11. On the rear end surface of the cassette 10, there is provided a pin receiver 20 which engages with a pin 19 of a cassette fitting stay 18 vertically provided on the shelf plate 8. The pin 19 has, as shown in FIG. 6(*b*), an oval cross section provided at a position biased from the fitting center of a base 21 thereof. The pin receiver 20 has, as shown in FIG. 6(*a*), a U-shaped cross section provided at a position biased from the fitting center of a base 22 thereof. The pin 19 and the pin receiver 20 can be fitted in ten levels at a fitting angle of 36 degrees, and hence improper fitting can be prevented by fitting each cassette 10 at a different angle. The pin 19 and the pin receiver 20 can be provided not only in one pair, but also in two or more pairs. Referring again to FIG. 4, on the rear end of the cassette 10 below the pin receiver 20, there is provided a cassette side connector 24 which is electrically connected to a shelf side connector 23 provided on the cassette fitting stay 18. Referring to FIG. 3, the top surface of the rear portion of the cassette 10 is covered by a transparent cover 25, on which the name and a photo of the medicine to be stored in this cassette 10 are displayed. On the side surface of the front portion of the cassette 10, a retention member 26 is fitted, which is formed in the shape of an inverted L. Retention member is arranged to allow medicine container 15*a* to be withdrawn from cassette, while preventing medicine container 15*b* from being withdrawn at the same time as container 15*a* due to friction.

Figure 7:
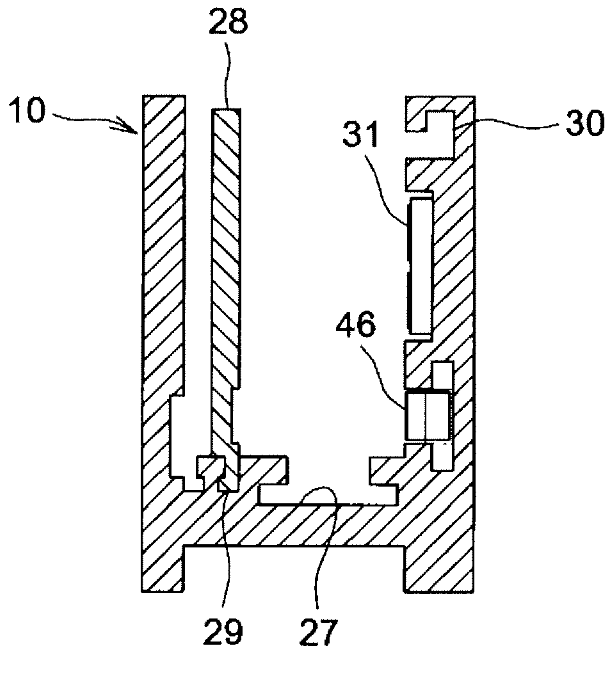
FIG. 7 is a sectional view of the cassette.
Figure 10A:
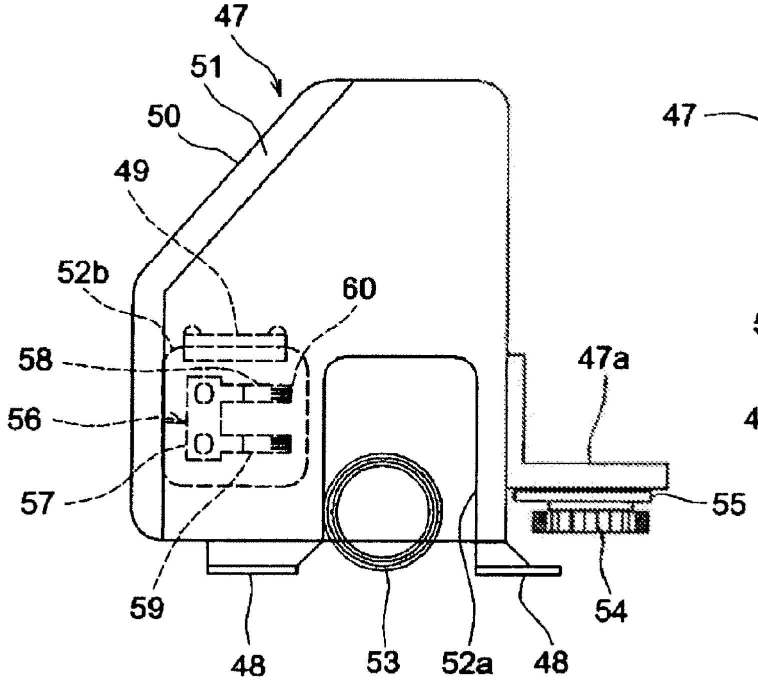
FIG. 10(*a*) is a sectional view of a pressing member.
Figure 10B:
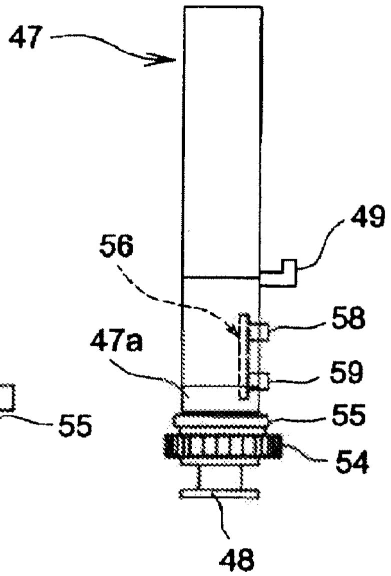
Figure 10C:
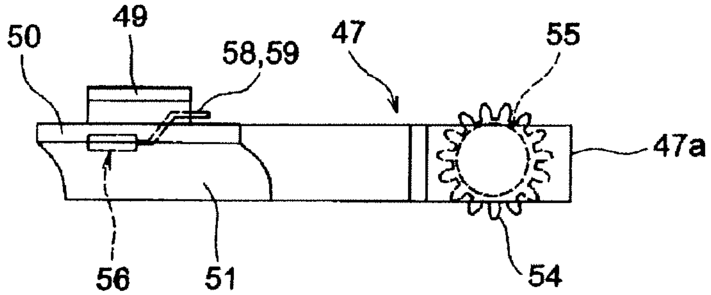

On the inner bottom surface of the cassette 10, as shown in FIG. 7, there is formed a slide groove 27 on which a band plate of a constant force spring 53 (described below with respect to FIGS. 10(*a*)-10(*c*)) is disposed, and with which a pressing member 47 slidably engages. On the inner bottom surface of the cassette 10 is also formed a spacer fitting groove 29 which is fitted with a spacer 28 for adjusting the inner width of the cassette 10 in accordance with the size of the medicine container 15. On the inner side surface of the cassette 10, a vibration-preventing rail 30 is formed with which a vibration-preventing boss 49 of the pressing member 47 engages (described below with respect to FIGS. 10(*a*)-10(*c*)). Below the vibration-preventing rail 30, a slide resistance unit 31 and a rack gear 46 are so fitted as to extend anteroposteriorly.

Figure 8:
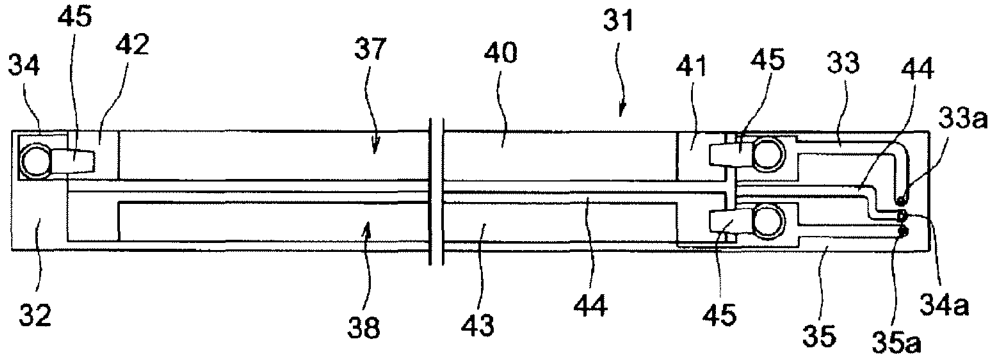
FIG. 8 is a plan view of a slide resistance unit.
Figure 9:
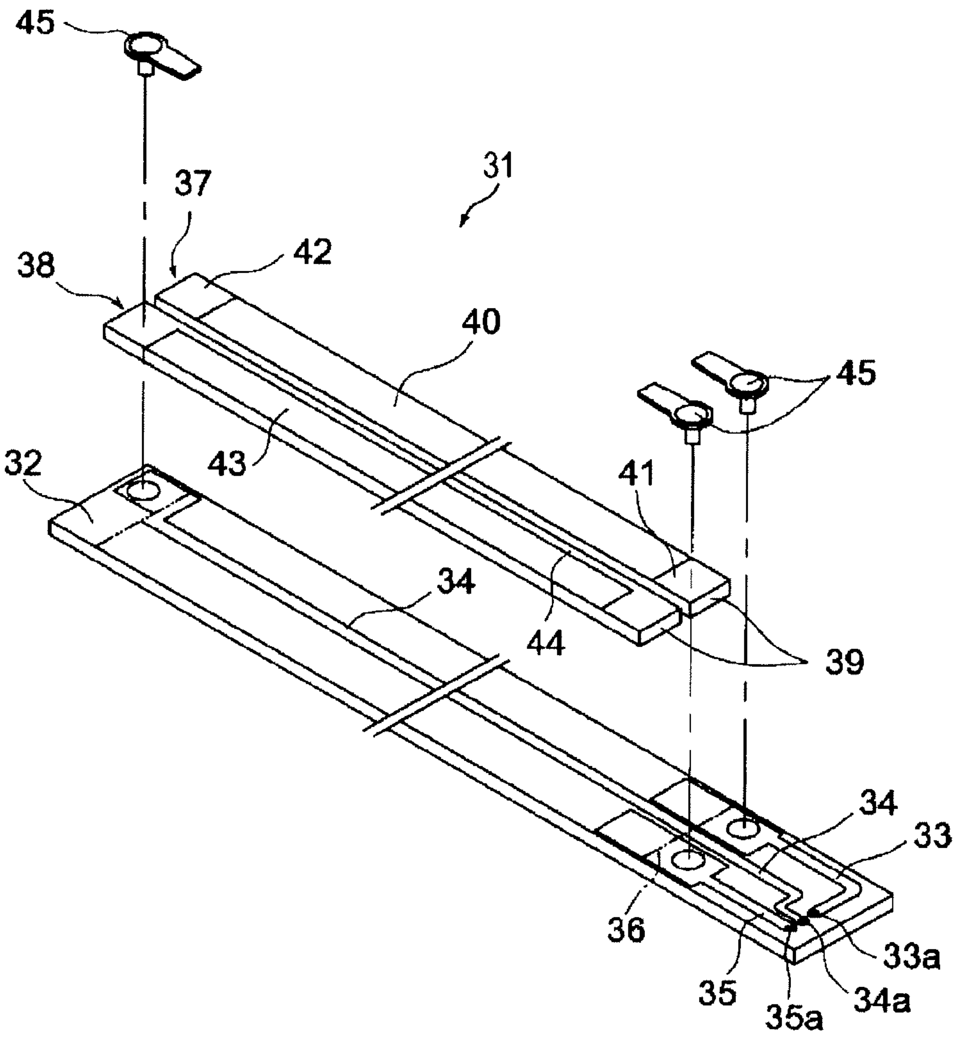
FIG. 9 is an exploded perspective view of the slide resistance unit of FIG. 8.
Figure 12:
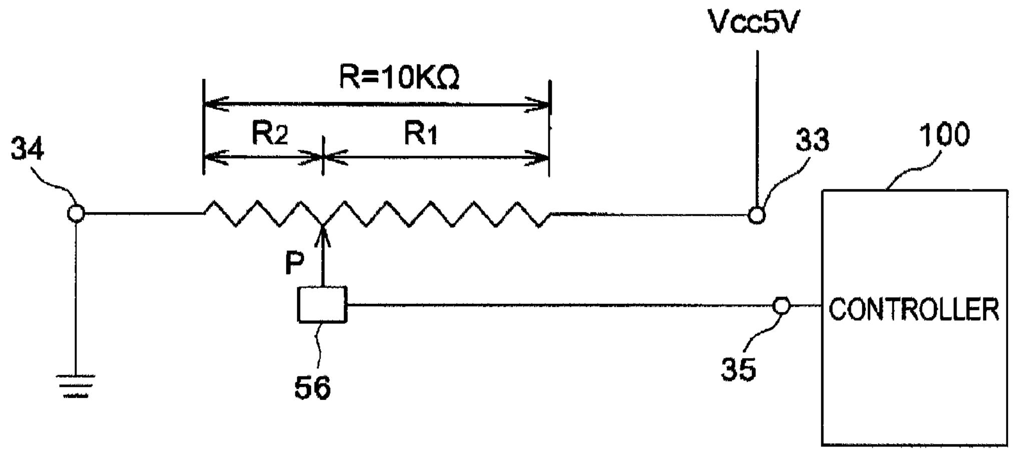
FIG. 12 is a circuit diagram of a measuring device using the slide resistance unit.

The slide resistance unit 31, as shown in FIGS. 8 and 9, has an insulating substrate 32 which is formed in an elongated rectangular shape and on one end of which a positive side conductive pattern 33, a negative side conductive pattern 34, and a detection side conductive pattern 35 are disposed. The negative side conductive pattern 34 extends to the other end of the substrate 32. On the conductive patterns 33, 34, and 35 of the substrate 32, two elongated first and second slide resistance plates 37 and 38 are attached in parallel by a two-sided tape 36. The first slide resistance plate 37 has a resistive paste 40 exposed on a Mylar film 39 with silver pastes 41 and 42 further exposed on both ends thereof. The resistive paste 40 between the silver pastes 41 and 42 has a resistance of 10Ω. Similarly, the second slide resistance plate 38 has a resistive paste 43 exposed on the Mylar film 39 with a silver paste 44 exposed on the one end portion to the other end portion through one of side edge portions. The silver paste 41 at one end of the first slide resistance plate 37 is connected to the positive side conductive pattern 33 via a metal fitting 45, and the silver paste 42 at the other end thereof is connected to the negative side conductive pattern 34 via the metal fitting 45. The silver paste 44 of the second slide resistance plate 38 is connected to the detection side conductive pattern 35 via a metal fitting 45. The positive side conductive pattern 33 of this slide resistance unit 31 is connected, as shown in FIG. 12, to a Vcc terminal of 5V having a constant-voltage power supply, the negative side conductive pattern 34 is grounded, and the detection side conductive pattern 35 is connected to a detection terminal of a controller 100.

Figure 11:
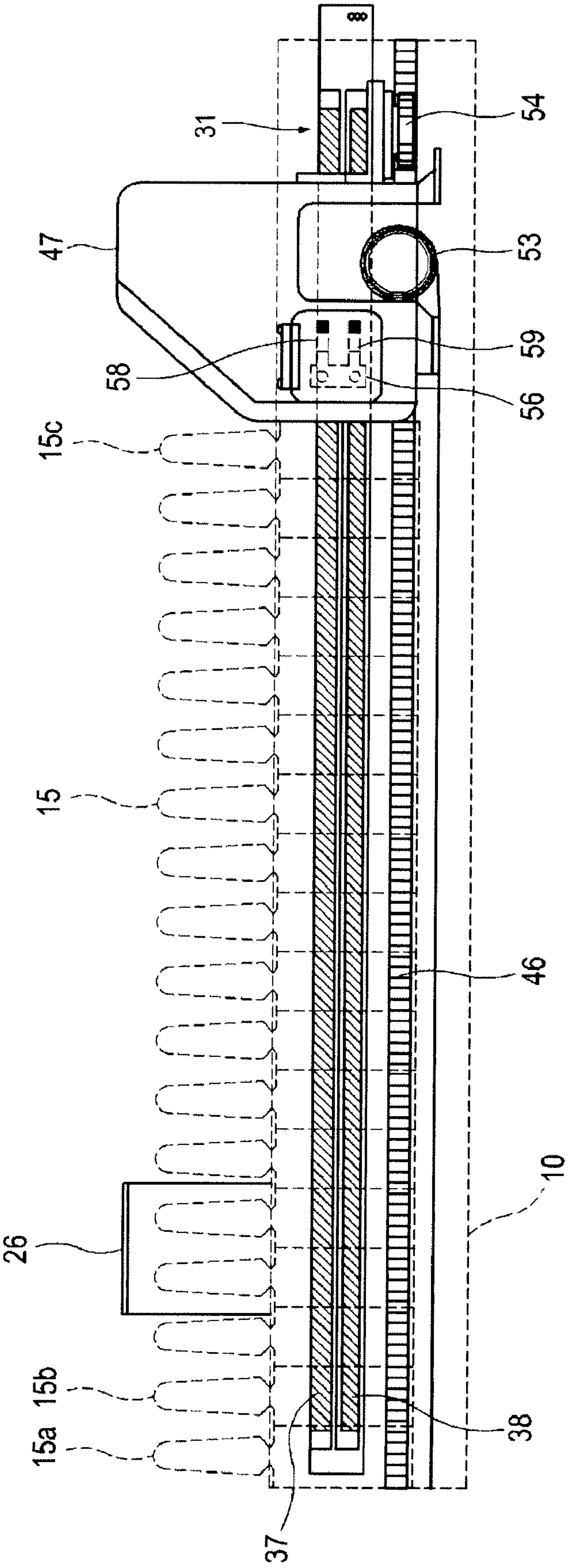
FIG. 11 is a longitudinal sectional view of the cassette.

The medicine containers 15 stored and arranged in a row in the cassette 10 are pressed forward by the pressing member 47. The pressing member 47 is, as shown in FIGS. 10(*a*)-10(*c*), formed in the shape of a rectangular plate, on the bottom surface of which an engaging projection 48 for engaging with the slide groove 27 of the aforementioned cassette 10 is formed, and on the side surface of which the vibration-preventing boss 49 for engaging with the vibration-preventing rail 30 of the cassette 10 is formed. The upper corner at the front end of the pressing member 47 is cut diagonally, forming an inclined surface 50. On this inclined surface 50, an insert guide part 51 is formed which is made of a surface formed in the shape of a circular are as viewed from the direction in which the medicine is inserted. The angle of the inclined surface 50 is set so that the medicine container 15 makes contact with the insert guide part 51 without fail when inserted from the above. The circular arc-shaped surface of the insert guide part 51 has a radius of curvature larger than the radius of the medicine container 15. The insert guide part 51 continues to the front end surface of the pressing member 47. On the bottom of the pressing member 47, a depression 52*a* is formed which stores a constant force spring 53. The constant force spring 53 includes a long band plate wound around. When the leading end thereof is pulled out, it is restored with a certain magnitude of force. Therefore, CONSTON (Registered trademark) or the like that is commercially available is used. The band plate of the constant force spring 53 is, as shown in FIG. 11, disposed along the slide groove 27 of the cassette 10, with the leading end thereof fixed to the front end of cassette 10. Referring again to FIGS. 10(*a*)-10(*c*), on a projection 47*a* formed in the shape of an L and provided on the rear end surface of the pressing member 47, there is provided a pinion gear 54 which engages with the rack gear 46 of the aforementioned cassette 10 and an oil damper 55 which is coupled with the pinion gear 54. Load is imposed on the pinion gear 54 during rotation under the action of the oil damper 55. This precludes occurrence of such problems as the pressing member 47 suddenly moving to hit the stored medicine container 15 under influence of a biasing force of the constant force spring 53.

Below the vibration-preventing boss 49 on the side surface of the pressing member 47, a depression 52*b* is formed, to which a pair of brushes 56 are fitted that makes sliding contact with the aforementioned slide resistance unit 31. This pair of brushes 56 includes a plate-like base 57 formed of an electric conductor and sliding parts 58 and 59 of conductive and elastic bodies fitted to the base 57 in parallel to each other. This pair of brushes 56 is designed such that fitting the base 57 to the pressing member 47 as shown in FIG. 11 causes the leading end portions of the sliding parts 58 and 59 to slidably make pressure contact with the first and second slide resistance plates 37 and 38 of the slide resistance unit 31. The sliding parts 58 and 59 each have a notch 60 formed on the leading ends thereof so as to make contact evenly with the slide resistance plates 37 and 38 even when inclined to some degree.

Figure 13:
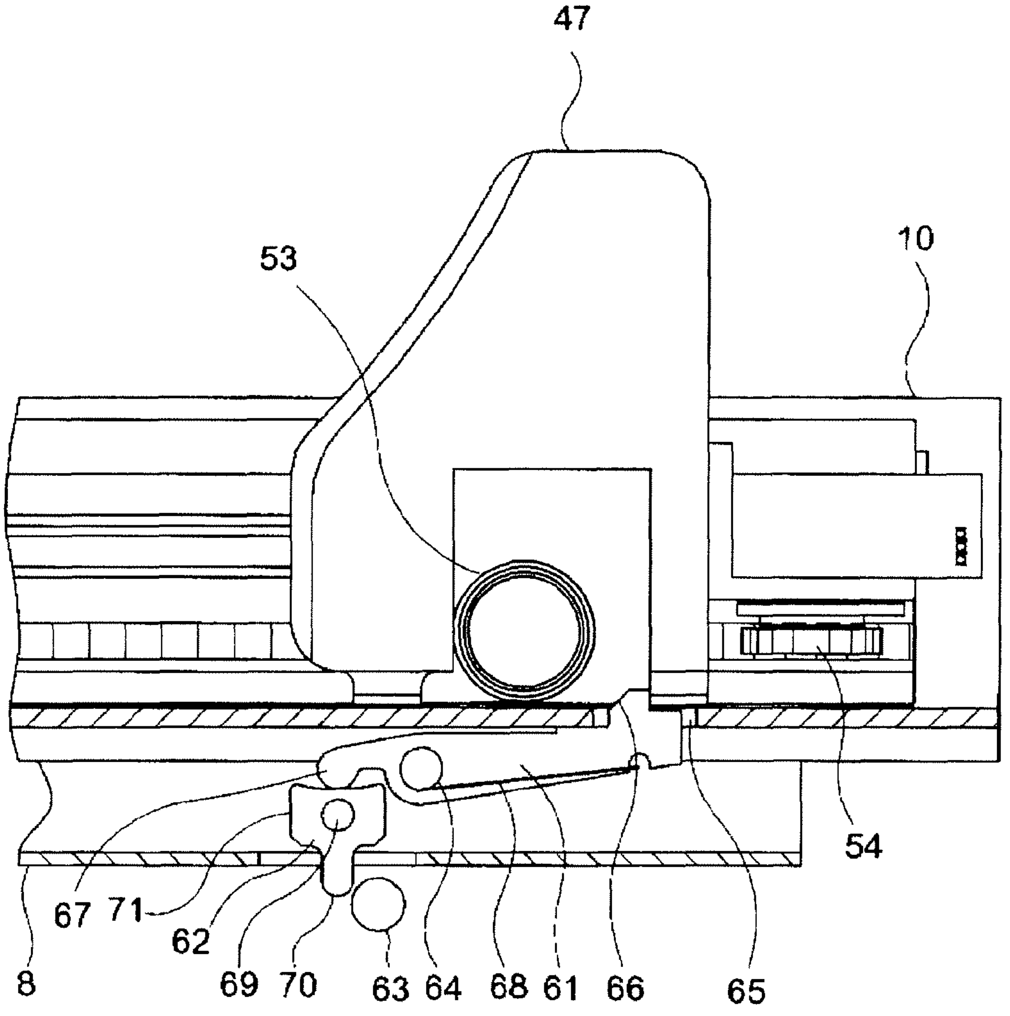
FIG. 13 is an enlarged side view of a pressing member provided with a locking means and an unlocking means.
Figure 14:
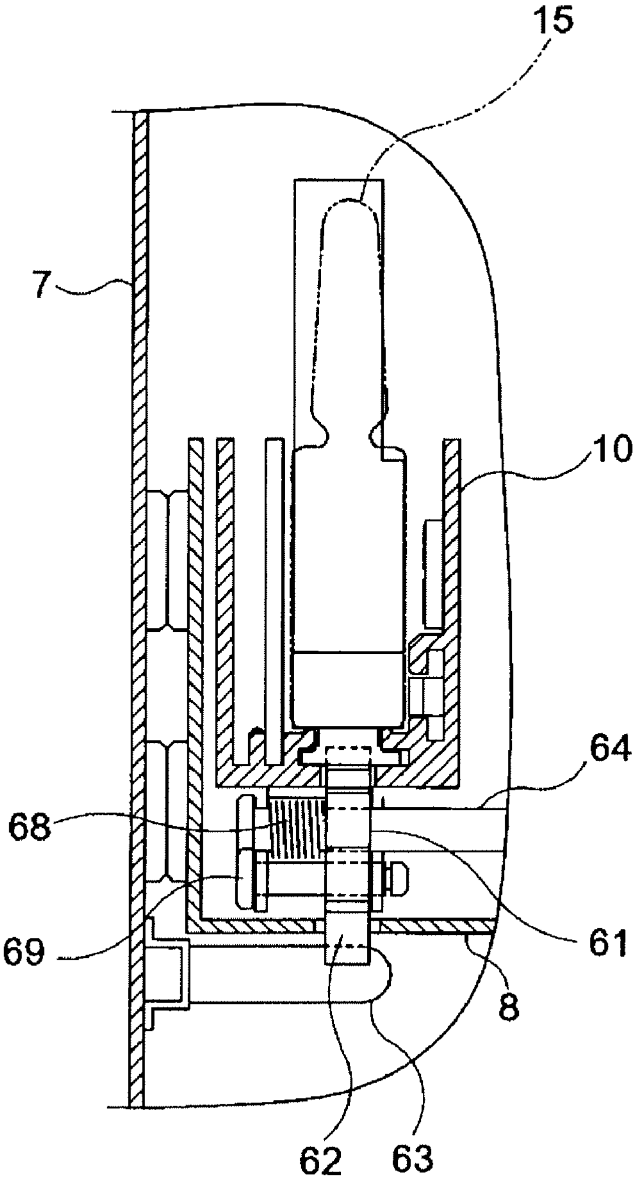
FIG. 14 is a sectional view of the pressing member and locking means and unlocking means of FIG. 13.
Figure 15:
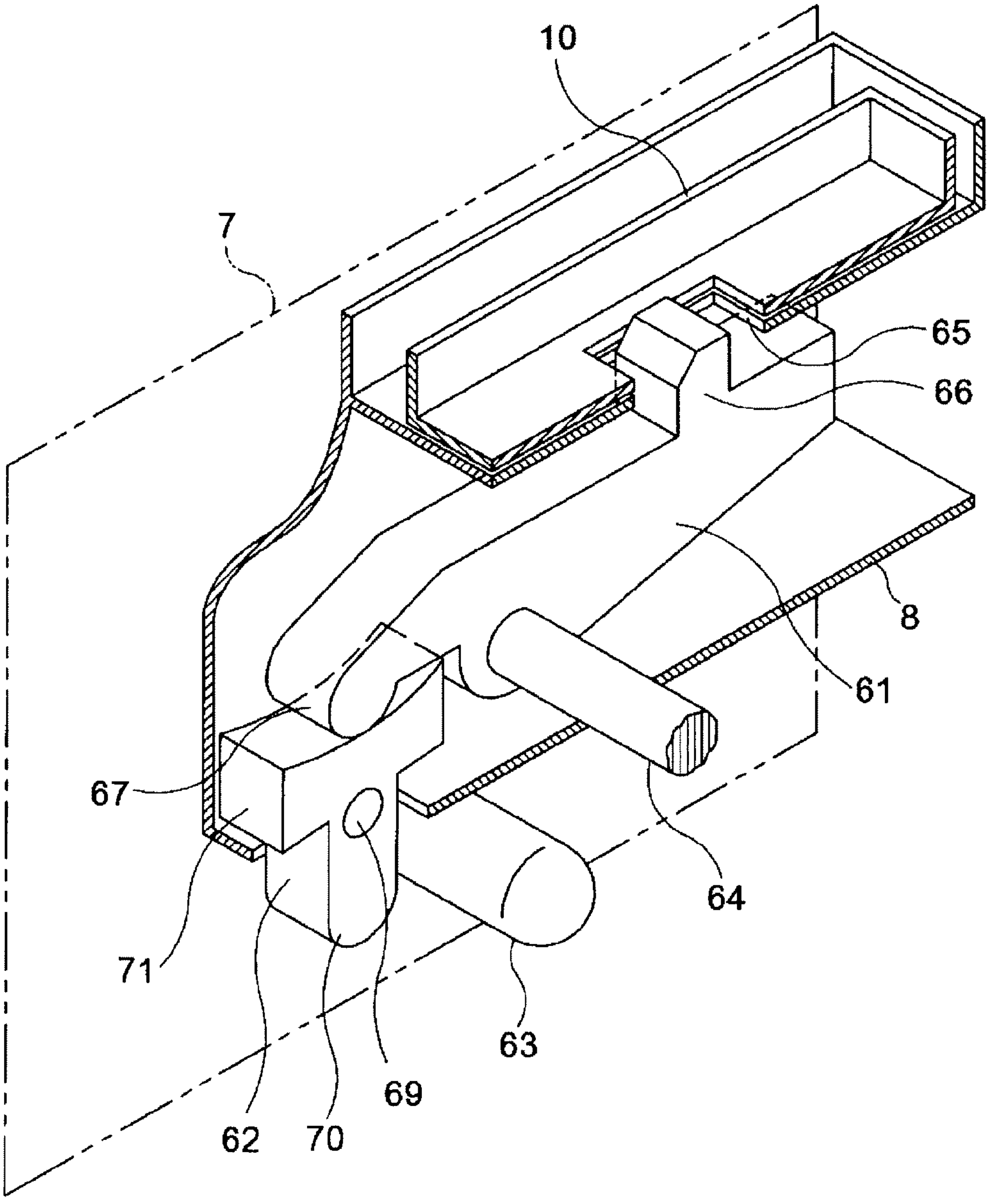
FIG. 15 is a perspective view of the locking means and the unlocking means of FIG. 13.

As shown in FIGS. 13, 14, and 15, each cassette 10 is provided with a locking lever 61 serving as a locking means, and an unlocking lever 62 and an unlocking pin 63 serving as unlocking means.

Figure 16:
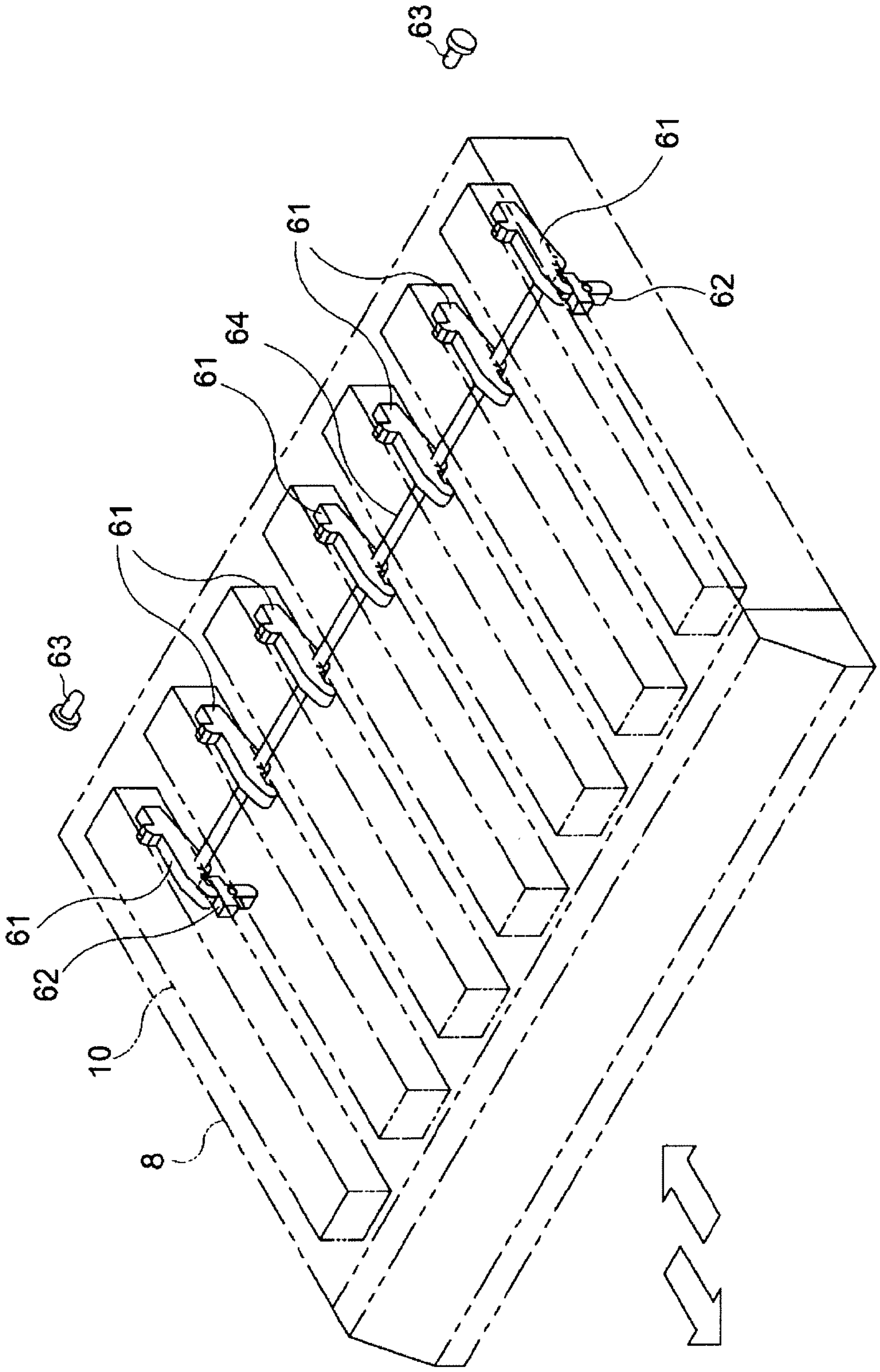
FIG. 16 is a perspective view of a shelf plate, showing the positional relationship between a locking lever, a common spindle, an unlocking lever, and an unlocking pin.
Figure 17A:
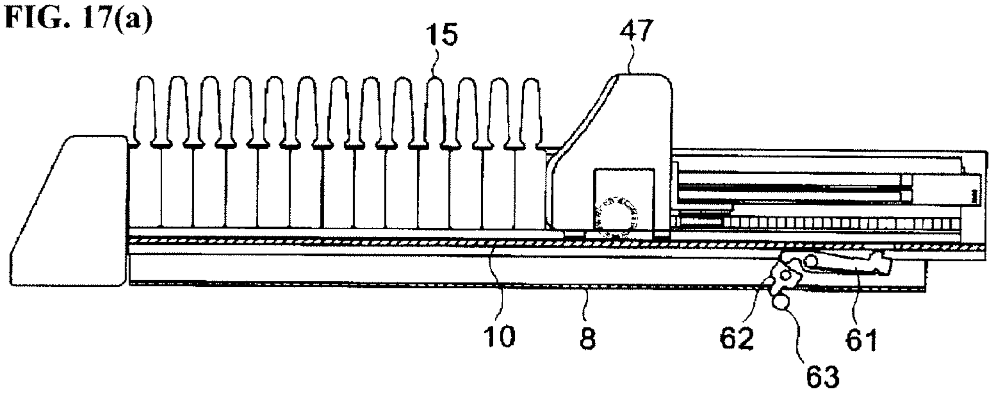
FIGS. 17(*a*)-17(*d*) are side views sequentially showing an example of the operations of locking means and unlocking means.
Figure 17B:
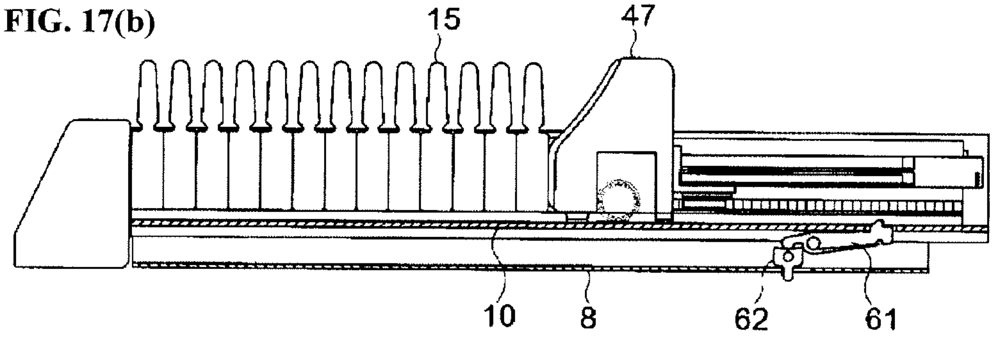
Figure 17C:
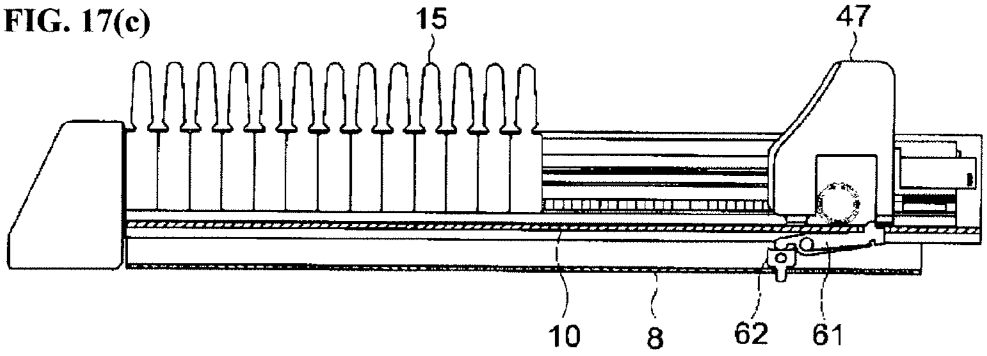
Figure 17D:
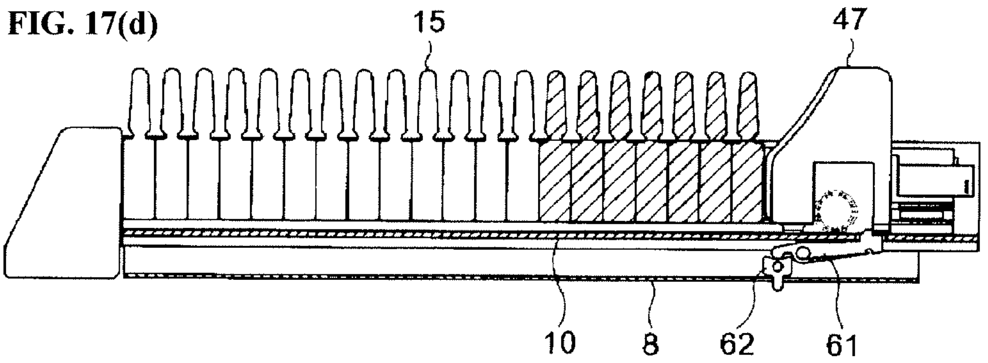
Figure 18A:
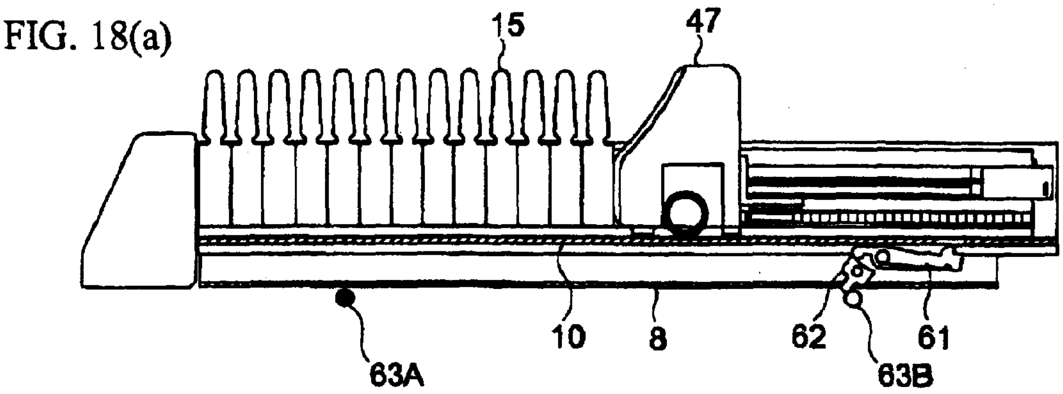
FIGS. 18(*a*)-18(*d*) are side views sequentially showing another example of the operations of locking means and unlocking means.
Figure 18B:
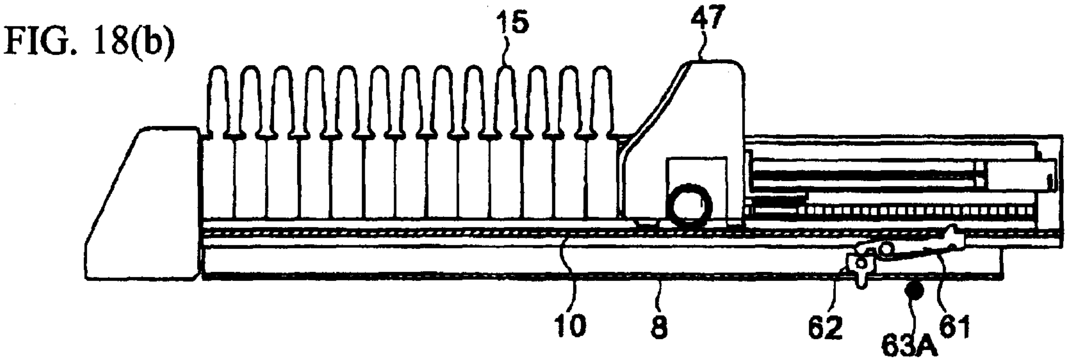
Figure 18C:
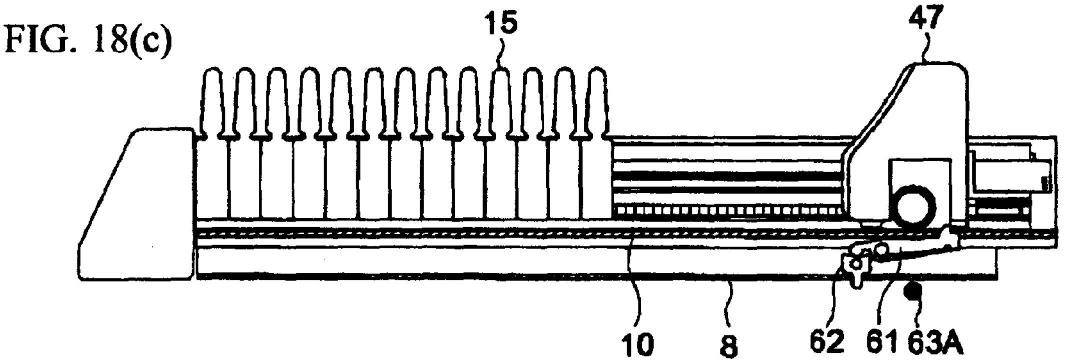
Figure 18D:
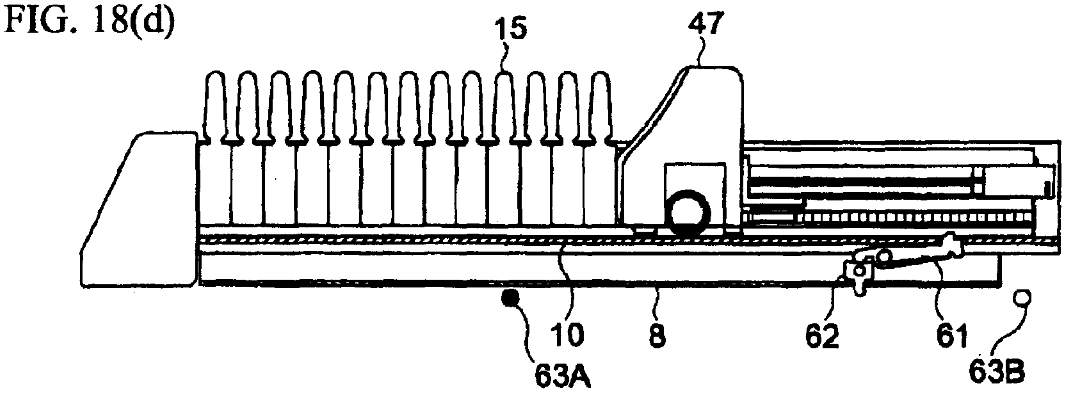

As shown in FIG. 16, the locking lever 61 of each cassette 10 is fixed to a common spindle 64 extending horizontally below the cassettes 10 between both side walls of the shelf plate 8 so as to be rotatable. As shown in FIG. 15, on the upper surface of one end portion of the locking lever 61 extending in the pushing-in direction of the shelf plate 8, there is formed a claw 66 facing the interior of the cassette 10 through a hole 65 provided in the bottom wall of the cassette 10. On the other end portion of the locking lever 61, extending in the pushing-in direction of the shelf plate 8, there is formed a columnar protrusion 67 parallel to the common spindle 64. Due to a torsion spring 68 shown in FIG. 14, the claw 66 of the locking lever 61 protrudes into the cassette 10 through the hole 65, and is biased so as to be engaged with the lower surface of the pressing member 47.

The unlocking lever 62 is mounted to both side walls of the shelf plate 8 so as to be rotatable around a spindle 69 protruding parallel to the common spindle 64. The unlocking lever 62 includes an engagement portion 70 extending vertically downwards from the spindle 69, and an operating portion 71 extending from the upper portion of the spindle 69 in the drawing-out direction and the pushing-in direction of the shelf plate 8, and when seen along the spindle 69, it exhibits a substantially T-shaped configuration. The upper surface of the operating portion 71 constitutes a concave surface that is in contact with the columnar protrusion 67 of the locking lever 61 provided below each of the cassettes 10 situated at both ends.

The unlocking pin 63 protrudes from the rear side (pushing-in side) portion of each of both side plates 7 in a columnar form, and when the shelf plate 8 is pushed in, it can be engaged with the engagement portion 70 of the unlocking lever 62.

It is not always necessary for the locking lever 61 to be supported by the common spindle 64, and it may also be provided separately. In this case, the unlocking lever 62 is provided for each locking lever 61, and the unlocking pin 63 is also provided for each locking lever 61. The unlocking pin 63 is not restricted to a columnar one, and it may also be a plate-like one or a substitute such as a screw.

In the medicine cart 1 structured as described above, to store the medicine container 15, the front panel 11 is opened to take out the cassette 10 from the shelf plate 8, the pressing member 47 is moved rearward, and a given number of medicine containers 15 are stored between the pressing member 47 and the front end of the cassette 10. The medicine containers 15 are pressed forward by the pressing member 47.

When the cassette 10 is fitted to the shelf plate 8, the cassette side connector 24 and the shelf side connector 23 electrically contact each other, whereby a voltage is supplied from the shelf plate 8 side to the slide resistance unit 31 of the cassette 10. The brush 56 of the pressing member 47 slides on the first and second slide resistance plates 37 and 38, and stops at a position in accordance with the quantity of the medicine containers 15. Where the stop position of the brush 56 is P, as shown in FIG. 12, a partial pressure of $Vp=R2/R$ is inputted to the controller 100 via the brush 56 located at the P position. The controller 100 reads out voltage or processing conditions stored in a storage device, and a processor calculates the quantity of medicine containers corresponding to the detected voltage and outputs the results as the current quantity of medicine containers.

Based on prescription information transmitted from a host computer when the medicine cart 1 is connected to the host computer, or based on prescription information inputted with a bar code reader or a keyboard when the medicine cart 1 is stand alone, the LED 12 of the front panel 11, which corresponds to the cassette 10 storing the medicine containers 15 required for prescription, lights up or blinks. Note that the LED 12 also lights up or blinks when the medicine containers 15 are out of stock.

The medicine container 15 may be taken out by holding and lifting upward the medicine container 15*a* at the forefront of the cassette 10. In this operation, the medicine container 15*b* at the second position may come out together with the medicine container 15*a* at the forefront due to friction, but the medicine container 15*b* at the second position hits the retention member 26 to be thereby prevented from coming out. When the medicine container 15*a* at the forefront is taken out, the row of the medicine containers 15 is pressed forward by the pressing member 47, and hence the medicine container 15*b* located at the second position is placed at the forefront. In this manner, the required quantity of medicine containers medicine containers 15 can be taken out sequentially. The shelf plates 8 provided vertically in three steps are arranged in the step-like manner so that they are shifted more rearward at more upward position from the first, the second, to the third steps. Thus, when the medicine container 15 is to be taken out from the cassette 10 of the shelf plate 8 located at the first step at the bottom, the shelf plate 8 at the second step does not get in the way.

When a wrong medicine container 15*a* is taken out or when an extra medicine container 15*a* is taken out, this medicine container 15*a* needs to be returned to the cassette 10. In this case, as shown in FIG. 3, by pressing the bottom of the medicine container 15 along the insert guide part 51 of the pressing member 47, the medicine container 15 is inserted between the medicine container 15*c* at the rearmost and the pressing member 47 to be thereby located at the rearmost.

In this manner, the aforementioned medicine cart 1 is capable of reliably taking out the medicine containers 15 one by one and also capable of easily returning the medicine container 15*a* once taken out to the cassette 10, thereby providing the excellent workability at the time of filling and returning the medicine container 15.

While in the aforementioned case each cassette 10 is extracted from the shelf plate 8 to accommodate the medicine containers 15, it is also possible to accommodate the medicine containers 15 in each cassette 10 in a collective manner by drawing out the shelf plate 8 from the main body 3.

That is, as shown in FIG. 17(*a*), in the state in which the shelf plate 8 has been inserted into the main body 3, the engagement portion 70 of the unlocking lever 62 abuts the unlocking pin 63 and rotates clockwise, with the end portion of the operating portion 71 pushing up the protrusion 67 of the locking lever 61. As a result, the locking lever 61 rotates clockwise against the biasing force, and the claw 66 is retracted from the hole 65 of the cassette 10. As a result, the pressing member 47 moves forwards, and presses the rearmost medicine container 15 forwardly.

When, in this state, the shelf plate 8 is drawn out from the main body 3 for the purpose of replenishment or inspection of the medicine containers 15, the unlocking lever 62 is, as shown in FIG. 17(*b*), separated from the unlocking pin 63, and is freed from constraint. As a result, the locking lever 61 rotates counterclockwise due to the biasing force thereof, and the protrusion 67 thereof pushes down the operating portion 71 of the unlocking lever 62. As a result, the unlocking lever 62 rotates counterclockwise, and comes to a stop at the point in time when the protrusion 67 of the locking lever 61 comes to the center of the upper surface of the operating portion 71. The claw 66 of the locking lever 61 enters the hole 65 of the cassette 10. However, since the pressing member 47 has already moved forwards, the claw 66 is not engaged with the pressing member 47.

Next, of the cassettes 10 of the drawn-out shelf plate 8, the pressing member 47 of the cassette 10 in which the medicine containers 15 are to be accommodated is moved rearwards. When the pressing member 47 goes over the claw 66 of the locking lever 61 while pressing down the same, the claw 66 of the locking lever 61 is engaged with the pressing member 47 and locked as shown in FIG. 17(*c*).

In this way, the pressing member 47 is locked at a predetermined rear position, and hence it is possible to replenish the space between the rearmost medicine container 15 and the pressing member 47 with medicine containers 15 easily and quickly without having to press the pressing member 47 against the biasing force as in the prior art, thus facilitating the replenishing operation.

When, as shown in FIG. 17(*d*), the shelf plate 8 with the cassette 10 replenished with the medicine containers 15 (indicated by the hatched portion in the drawing) is pushed into the main body 3, the engagement portion 70 of the unlocking lever 62 abuts the unlocking pin 63 and rotates clockwise, and the end portion of the operating portion 71 pushes up the protrusion 67 of the locking lever 61. As a result, the locking lever 61 rotates clockwise against the biasing force thereof, and the claw 66 retreats from the pressing member 47. As a result, the pressing member 47 presses the rearmost medicine container 15, and normal taking-out operation of the medicine container 15 becomes possible as shown in FIG. 17(*a*).

In FIGS. 18(*a*) through 18(*d*), first and second unlocking pins 63A, 63B are provided at two positions of the front side (drawing-out side) portion and the rear side (pushing-in side) portion of the side plate 7 of the main body 3, respectively. In order to clearly distinguish the two unlocking pins from each other, the first unlocking pin 63A on the front side is filled in with black.

When the shelf plate 8 in the accommodated state shown in FIG. 18(*a*) is drawn out, the unlocking lever 62 goes over the first unlocking pin 63A on the front side and the state as shown in FIG. 18(*b*) is attained. Here, as shown in FIG. 18(*c*), the pressing member 47 is moved rearwards to be locked. When, in this locked state, no medicine container 15 is accommodated or filling with the medicine containers 15 is not effected, pushing the shelf plate 8 into the main body 3 causes the unlocking lever 62 to abut the first unlocking pin 63 on the front side and rotate, and hence the locking lever 61 rotates, and the lock of the pressing member 47 is canceled. As a result, the pressing member 47 moves forwards, and presses the rearmost medicine container 15. In this way, by providing the unlocking pins 63A, 63B not only at the rear side portion but also at the front side portion of the side plate 7 of the main body 3, it is possible to cancel the lock of the pressing member 47 immediately after the pushing-in of the shelf plate 8, and it is possible to prevent disturbance of the row of medicine containers medicine containers 15 and toppling down of the rearmost medicine container 15 due to vibration involved at the time of pushing-in operation.

Figure 19:
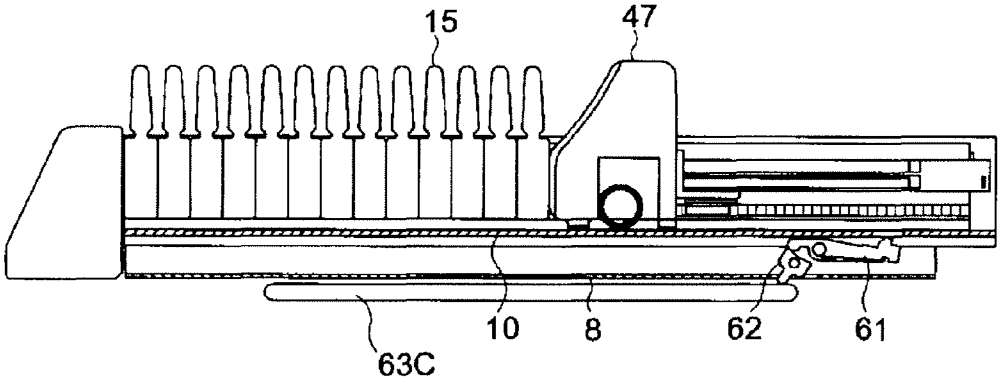
FIG. 19 is a side view showing another example of the unlocking means.

While the first unlocking pin 63A and the second unlocking pin 63B are separate members, the unlocking member of the present invention is not restricted to this construction, and it may instead be formed by a single component formed of a thin and elongated bar. That is, as shown in FIG. 19, the unlocking member may alternatively be a flat unlocking bar 63C having a first unlocking end situated at the front side (drawing-out side) portion of the side plate 7 of the main body 3 and a second unlocking end situated at the rear side (pushing-in side) thereof. In this case, while the unlocking lever 62 is in contact with the unlocking bar 63C, the lock of the pressing member 47 is canceled, and a similar effect is obtained.

When the medicine cart 1 is not in use, the shutter 2 can be closed so that an unauthorized third party cannot take out the medicine container 15, which provides safety. Moreover, it is desirable for the medicine cart 1 to be powered off by closing the shutter 2.

Figure 20:
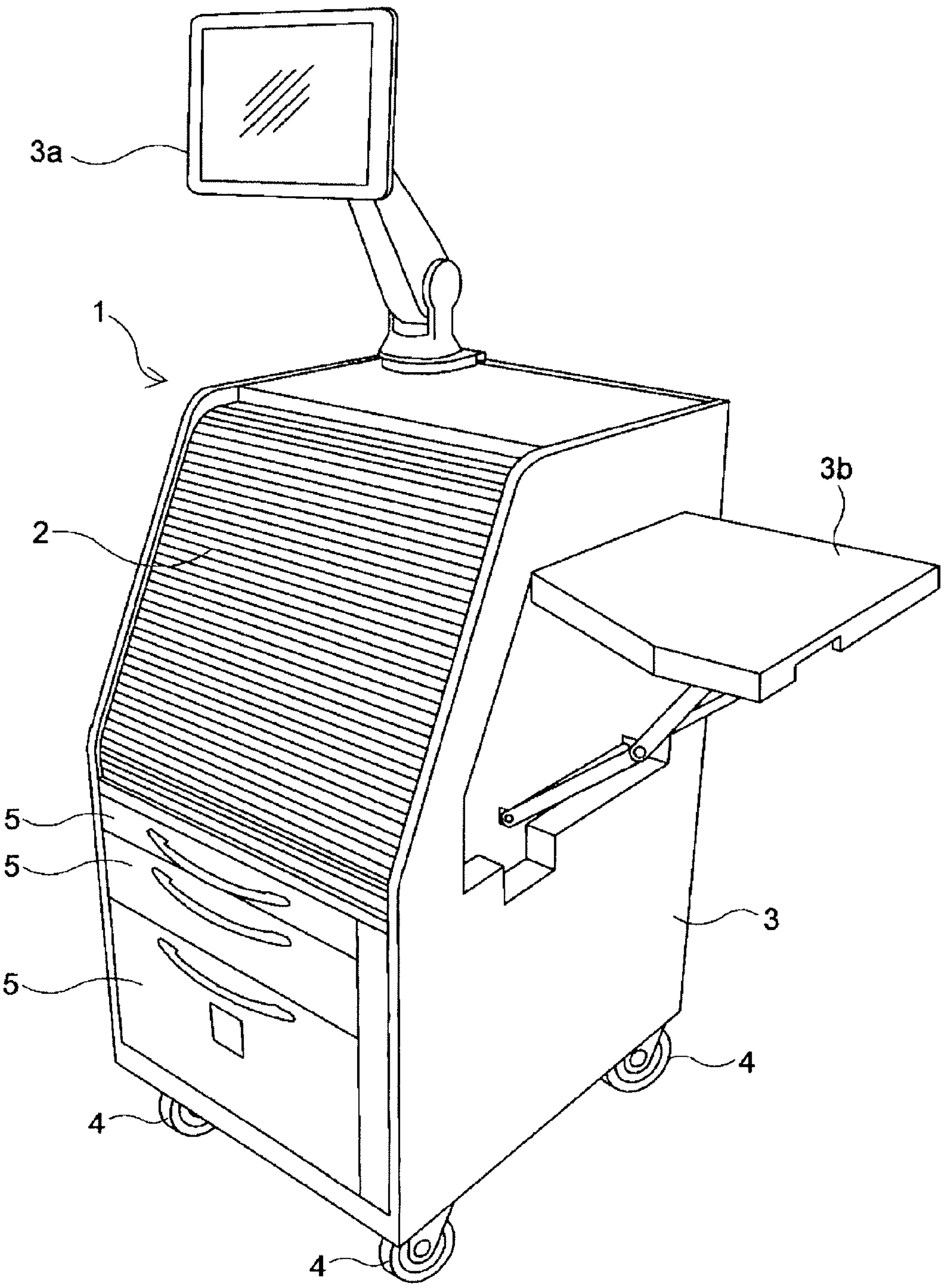
FIG. 20 is a perspective view of a medicine cart.

In the aforementioned embodiment, it is possible to adopt a construction in which, as shown in FIG. 20, a display panel 3*a* is provided on the top surface of the main body of the medicine cart 1 and in which an image of the removed medicine containers 15 and the name and number thereof are displayed on the display panel 3*a*, whereby it is possible to check the removed medicine containers against the display on the display panel. Further, it is also possible to provide an auxiliary shelf 3*b* on a side surface of the main body of the medicine cart 1 so as to be accommodated in the main body, and to use the auxiliary shelf as an operation stand on which the medicine containers 15 are accommodated or the taken-out medicine containers 15 temporarily placed.

The invention claimed is:

1. A medicine cart comprising:

a plurality of cassettes which are upwardly open and accommodate a plurality of medicine containers in an upright state in a row;

a shelf plate on which a plurality of the cassettes are placed and which is drawable out of a main body of the medicine cart;

a pressing member in each of the plurality of cassettes, the pressing member being adapted to forwardly press a rearmost medicine container;

a locking means for locking the pressing member of each of the plurality of cassettes at a predetermined position in its respective cassette; and an unlocking means for canceling the lock of each of the pressing members, wherein the unlocking means simultaneously cancels the lock of the pressing member in each of the plurality of the cassettes caused by the locking means if the shelf plate is pushed into the main body of the medicine cart, wherein the locking means comprises a plurality of locking levers, wherein each locking lever is rotatably provided to correspond to a respective one of the plurality of the cassettes, wherein each locking lever comprises a claw biased in a direction wherein the claw is lockable to its respective pressing member, and wherein each locking lever is fixed to a common spindle and rotatable around the common spindle.

2. A medicine cart according to claim 1, wherein the unlocking means comprises an unlocking lever which is rotatably provided on the shelf plate and is adapted to rotate the locking levers against a biasing force to cancel the locking of each of the claws to their respective pressing member, and at least one unlocking member on the main body of the medicine cart which is adapted to rotate the unlocking lever if the shelf plate is pushed in or drawn out of the main body.

3. A medicine cart according to claim 2, wherein the unlocking lever provided on the shelf plate comprises an engagement portion that engages with the at least one unlocking member on the main body of the medicine cart and an operating portion abutting one of the locking levers.

4. A medicine cart according to claim 3, wherein the engagement portion of the unlocking lever extends downwardly from a spindle of the unlocking lever, and wherein the operating portion extends horizontally on both sides from the spindle of the unlocking lever.

5. A medicine cart according to claim 2, wherein the at least one unlocking member on the main body of the medicine cart comprises a first unlocking member provided at a front side portion of the main body and a second unlocking member provided at a rear side portion of the main body.

6. A medicine cart according to claim 2, wherein the at least one unlocking member on the main body of the medicine cart comprises a pin.

7. A medicine cart according to claim 2, wherein the at least one unlocking member on the main body of the medicine cart comprises an unlocking bar having at respective ends thereof a first unlocking end provided at a front side portion of the main body and a second unlocking end provided at a rear side portion of the main body.

8. A medicine cart according to claim 3, wherein the at least one unlocking member on the main body of the medicine cart comprises a first unlocking member provided at a front side portion of the main body and a second unlocking member provided at a rear side portion of the main body.

9. A medicine cart according to claim 4, wherein the at least one unlocking member on the main body of the medicine cart comprises a first unlocking member provided at a front side portion of the main body and a second unlocking member provided at a rear side portion of the main body.

10. A medicine cart according to claim 3, wherein the at least one unlocking member on the main body of the medicine cart comprises a pin.

11. A medicine cart according to claim 4, wherein the at least one unlocking member on the main body of the medicine cart comprises a pin.

12. A medicine cart according to claim 5, wherein the first and second unlocking members on the main body of the medicine cart each comprise a pin.

13. A medicine cart according to claim 8, wherein the first and second unlocking members on the main body of the medicine cart each comprise a pin.

14. A medicine cart according to claim 9, wherein the first and second unlocking members on the main body of the medicine cart each comprise a pin.

15. A medicine cart according to claim 3, wherein the at least one unlocking member on the main body of the medicine cart comprises an unlocking bar having at respective ends thereof a first unlocking end provided at a front side portion of the main body and a second unlocking end provided at a rear side portion of the main body.

16. A medicine cart according to claim 4, wherein the at least one unlocking member on the main body of the medicine cart comprises an unlocking bar having at respective ends thereof a first unlocking end provided at a front side portion of the main body and a second unlocking end provided at a rear side portion of the main body.

17. A medicine cart comprising:

a plurality of cassettes which are upwardly open and accommodate a plurality of medicine containers in an upright state in a row;

a shelf plate on which a plurality of the cassettes are placed and which is drawable out of a main body of the medicine cart;

a pressing member in each of the plurality of cassettes, the pressing member being adapted to forwardly press a rearmost medicine container;

a locking means for locking the pressing member of each of the plurality of cassettes at a predetermined position in the cassette; and an unlocking means for canceling the lock of the each of pressing members if the shelf plate is pushed into the main body of the medicine cart or drawn out of the main body of the medicine cart, wherein the locking means comprises a plurality of locking levers, wherein each locking lever is rotatably provided to correspond to a respective one of the plurality of the cassettes, wherein each locking lever comprises a claw biased in a direction wherein the claw is lockable to its respective pressing member, and wherein each locking lever is fixed to a common spindle and rotatable around the common spindle.

* * * * *